(12) United States Patent
Patenaude et al.

(10) Patent No.: US 8,653,954 B2
(45) Date of Patent: Feb. 18, 2014

(54) SYSTEMS AND METHODS FOR DETECTING AN ERROR IN THE INSTALLATION OF AN ELECTRICAL COMPONENT

(75) Inventors: Russell A. Patenaude, Macomb Township, MI (US); Nicholas J. Peariso, Oak Park, MI (US)

(73) Assignee: General Motors LLC, Detroit, MI (US)

( * ) Notice: Subject to any disclaimer, the term of this patent is extended or adjusted under 35 U.S.C. 154(b) by 331 days.

(21) Appl. No.: 13/094,662

(22) Filed: Apr. 26, 2011

(65) Prior Publication Data

US 2012/0274456 A1 Nov. 1, 2012

(51) Int. Cl.
*B60L 1/00* (2006.01)
*B60R 25/00* (2013.01)
*B60Q 1/00* (2006.01)
*B60R 25/10* (2013.01)
*G08B 23/00* (2006.01)

(52) U.S. Cl.
USPC ............. 340/425.5; 340/426.15; 340/426.18; 340/426.22; 340/428; 340/500; 307/9.1; 307/10.1

(58) Field of Classification Search
None
See application file for complete search history.

(56) References Cited

U.S. PATENT DOCUMENTS

| 7,421,321 | B2 * | 9/2008 | Breed et al. ................. 701/33.6 |
| 2006/0197380 | A1 * | 9/2006 | DiCroce ........................ 307/9.1 |
| 2008/0071882 | A1 * | 3/2008 | Hering et al. ................ 709/217 |
| 2009/0125193 | A1 * | 5/2009 | Fernandez ...................... 701/48 |
| 2010/0127857 | A1 * | 5/2010 | Kilmurray et al. ............ 340/540 |
| 2011/0082621 | A1 * | 4/2011 | Berkobin et al. .............. 701/33 |
| 2011/0196571 | A1 * | 8/2011 | Foladare et al. ............... 701/33 |
| 2012/0086808 | A1 * | 4/2012 | Lynam et al. ................ 348/148 |

* cited by examiner

*Primary Examiner* — George Bugg
*Assistant Examiner* — Renee Dorsey
(74) *Attorney, Agent, or Firm* — Ingrassia Fisher & Lorenz, P.C.

(57) ABSTRACT

A system and method for detecting an error in the installation of an electrical component in a vehicle having a vehicle bus is disclosed herein. The system includes, but is not limited to a vehicle communication interface that is configured to be communicatively coupled with the vehicle bus and to detect a first power state of the vehicle. The system further includes an aftermarket telematics unit that is configured to be electrically connected to the vehicle and to wirelessly communicate with the vehicle communication interface. The vehicle communication interface is further configured to detect a second power state of the aftermarket telematics unit, to compare the first power state with the second power state, and to alert a third party when the first power state and the second power state do not correspond with one another.

16 Claims, 3 Drawing Sheets

SYSTEMS AND METHODS FOR DETECTING AN ERROR IN THE INSTALLATION OF AN ELECTRICAL COMPONENT

TECHNICAL FIELD

The technical field generally relates to aftermarket telematics units, and more particularly relates to systems and method for detecting an error in the electrical wiring that connects an aftermarket telematics unit to a vehicle.

BACKGROUND

Telematics services are services that are provided by a call center to a vehicle and/or to the operator of a vehicle that relate to various needs of the vehicle or the operator. Telematics services commonly include, but are not limited to, the remote monitoring of vehicle maintenance needs, the provision of turn by turn navigation guidance, the coordination of emergency services during vehicle emergencies, the provision of door unlock services when the vehicle's owner is locked out of the vehicle, and the provision of theft tracking services after a vehicle has been stolen, to name just a few.

A telematics service system conventionally includes a telematics unit mounted to the vehicle, a call center located remotely from the vehicle, and a communication network that communicatively connects the two. Historically, the telematics unit has been embedded in the vehicle (i.e., mounted to the vehicle during vehicle assembly) and directly connected to the vehicle bus. This connection to the vehicle bus permits the telematics unit to provide many of the telematics services (e.g., remote door unlock).

Because of the popularity of telematics services, aftermarket telematics units are also in the market place. Such aftermarket telematics units make it possible for drivers of vehicles that lack an embedded telematics unit to, nevertheless, receive some or all of the available telematics services. In some applications, however, because of vehicle design, the aftermarket telematics unit is not directly connected to the vehicle bus. To accommodate this limitation, a vehicle communication interface (also known as a "dongle") is provided to permit the aftermarket telematics unit to wirelessly communicate with the vehicle bus. The vehicle communication interface is configured to plug into an access port on the vehicle bus and to wirelessly communicate with the aftermarket telematics unit, thereby giving the aftermarket telematics unit access to the vehicle bus.

In addition to being wirelessly connected to the vehicle communication interface, the aftermarket telematics unit is wired into the vehicle's electrical system or battery to draw the power that is needed to operate the aftermarket telematics unit. In a known example, to receive electrical power from the vehicle, the aftermarket telematics unit includes a constant power line, a switched power line, and a ground line that are configured to be connected to a constant power line, a switched power line, and a ground line, respectively, of the vehicle.

When the electrical lines of the aftermarket telematics unit are correctly connected to the respective electrical lines of the vehicle, the power state of the aftermarket telematics unit will correspond with the power state of the vehicle. For example, the aftermarket telematics unit is configured to operate in three different power states; an on-mode when the vehicle is powered on (i.e., when the vehicle's ignition is turned to either the run or the accessory position), a standby-mode when the vehicle is powered off (e.g., when the vehicle's ignition is turned to the off position), and an off-mode when the vehicle has been powered off for greater than a predetermined length of time, typically five consecutive days.

When in the on-mode, the aftermarket telematics unit is configured to provide its full range of services to the vehicle and the operator. All of the aftermarket telematics unit's systems are activated and ready to receive commands/inputs. When in the standby-mode, the majority of the systems of the aftermarket telematics unit are powered down and only a few of the aftermarket telematics unit's systems remain either activated or cycle through alternating periods of sleep and wakefulness. This allows the aftermarket telematics unit to receive communications from the call center even while the vehicle is turned off, without excessively draining the battery. When in the off-mode, virtually all of the systems of the aftermarket telematics unit are powered down to minimize battery drain.

If the three electrical lines of the aftermarket telematics unit are not connected to the correct respective electrical lines of the vehicle, the power state of the aftermarket telematics unit may not properly correspond with the power state of the vehicle. This, in turn, may cause some or all of the telematics services to be unavailable to the customer and/or the vehicle during certain periods of vehicle operation.

SUMMARY

Various examples are disclosed herein of a system and method for detecting an error in the installation of an electrical component in a vehicle having a vehicle bus.

In a first non-limiting example, the system includes, but is not limited to, a vehicle communication interface that is configured to be communicatively coupled with the vehicle bus and to detect a first power state of the vehicle. The system further includes an aftermarket telematics unit that is configured to be electrically connected to the vehicle and to wirelessly communicate with the vehicle communication interface. The vehicle communication interface is further configured to detect a second power state of the aftermarket telematics unit, to compare the first power state with the second power state, and to alert a third party when the first power state and the second power state do not correspond with one another.

In another non-limiting example, the system includes, but is not limited to, a vehicle communication interface that is configured to be communicatively coupled with the vehicle bus and to detect a first power state of the vehicle. The system further includes an aftermarket telematics unit that is configured to be electrically connected to the vehicle and to wirelessly communicate with the vehicle communication interface. The vehicle communication interface is further configured to detect a second power state of the aftermarket telematics unit, to compare the first power state with the second power state, to determine a cause for non-correspondence between the first power state and the second power state when the first power state and the second power state do not correspond with one another, to alert a third party when the first power state and the second power state do not correspond with one another, and to communicate the cause to the third party.

In another non-limiting example the method includes, but is not limited to, the steps of detecting a first power state of a vehicle and a second power state of an aftermarket telematics unit, comparing the first power state with the second power state, and determining that a wiring error exists when the first power state and the second power state do not correspond.

DESCRIPTION OF THE DRAWINGS

One or more examples will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

Various examples of a system and a method are disclosed herein for determining when the electrical wires of an aftermarket telematics unit are incorrectly connected to the electrical wires of a vehicle. In an example, the vehicle communication interface, which permits the aftermarket telematics unit to communicate with the vehicle bus, is configured to detect the power state of the vehicle (on and off), to detect the power state of the aftermarket telematics unit (on, standby, and off) and to compare the two power states.

When the aftermarket telematics unit is correctly installed, the power state of the vehicle and the power state of the aftermarket telematics unit will correspond with each other. For example, when the vehicle is on, the aftermarket telematics unit should be on. When the vehicle is off, the aftermarket telematics unit should be in standby mode. When the vehicle has remained off for longer that a predetermined period of time (typically 120 hours), then the aftermarket telematics unit should be off If, when comparing the power state of the vehicle with the power state of the aftermarket telematics unit, the vehicle communication interface determines that the two power states do not correspond with one another (e.g., the vehicle is off while the aftermarket telematics unit is on), the vehicle communication interface will make the determination that the aftermarket telematics unit has been incorrectly installed. In some examples, the type of non-correspondence that is detected by the vehicle communication interface can be used to determine the type of wiring error that was made when installing the aftermarket telematics unit.

A greater understanding of the examples of the systems and methods disclosed herein may be obtained through a review of the illustrations accompanying this application together with a review of the detailed description that follows.

Figure 1:
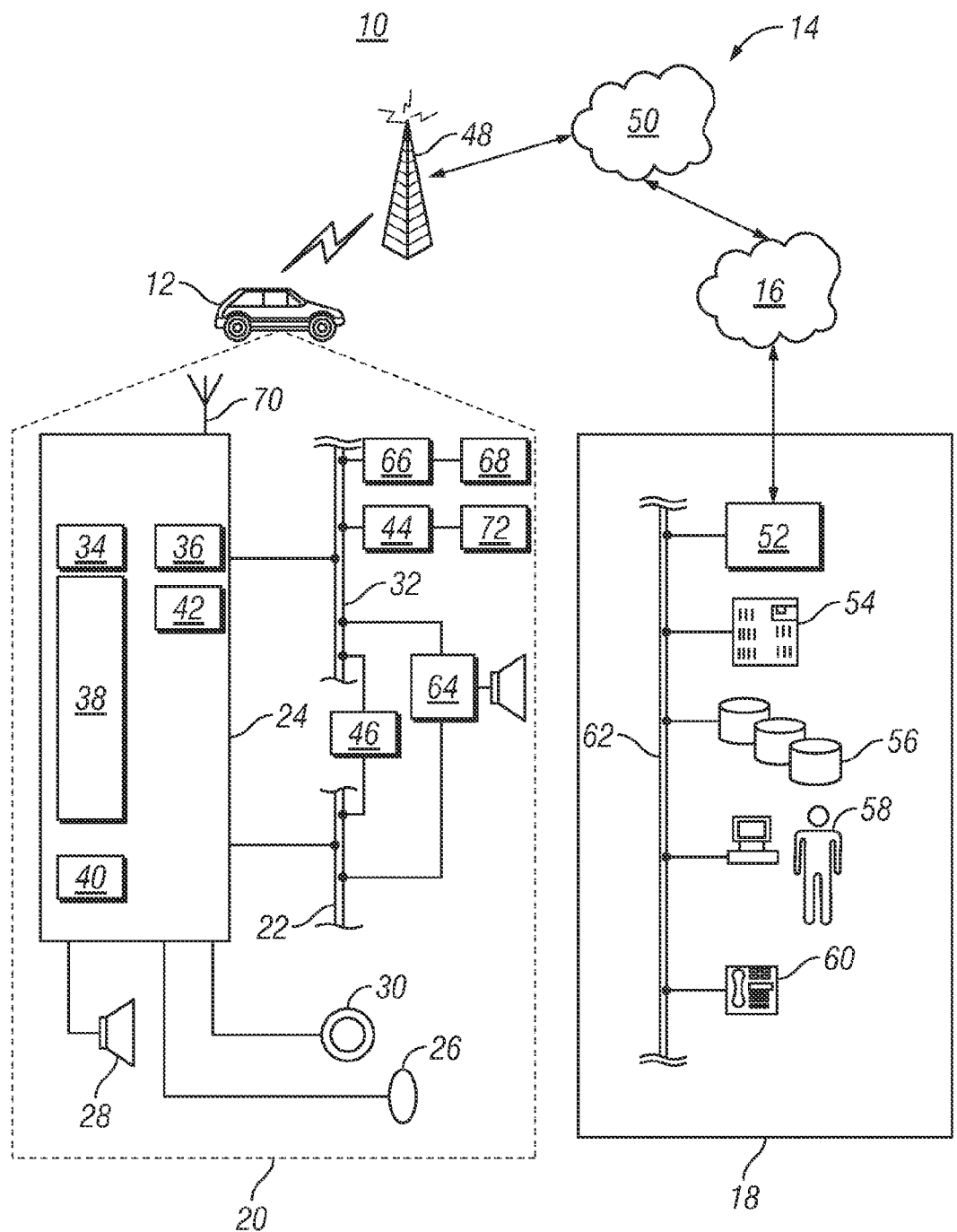
FIG. 1 is a schematic view illustrating a non-limiting example of a telematics service system compatible for use with examples of the system for detecting an error in the installation of an electrical component disclosed herein.

With reference to FIG. 1, there is shown a non-limiting example of a telematics system 10 that is compatible for use with the systems and the methods for detecting an error in the installation of an electrical component described herein. Telematics system 10 generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated telematics system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over telematics system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within processing device 38.

The telematics unit 24 may provide various services including: turn-by-turn directions and other navigation-related services provided in conjunction with the GPS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. In order to enable successful data transmission over the voice channel, wireless modem 36 applies some type of encoding or modulation to convert the digital data so that it can be communicated through a vocoder or speech codec incorporated in the cellular chipset/component 34. Any suitable encoding or modulation technique that provides an acceptable data rate and bit error can be used with the present examples. Dual mode antenna 70 services the GPS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14. For example, a base station and a cell tower could be co-located at the same site or they could be remotely located, and a single base station could be coupled to various cell towers or various base stations could be coupled with a single MSC, to list but a few of the possible arrangements. A speech codec or vocoder may be incorporated in one or more of the base stations, but depending on the particular architecture of the wireless network, it could be incorporated within a Mobile Switching Center or some other network components as well.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either the live advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a manned call center 18, it will be appreciated that the call center 18 can be any central or remote facility, manned or unmanned, mobile or fixed, to or from which it is desirable to exchange voice and data.

Figure 2:
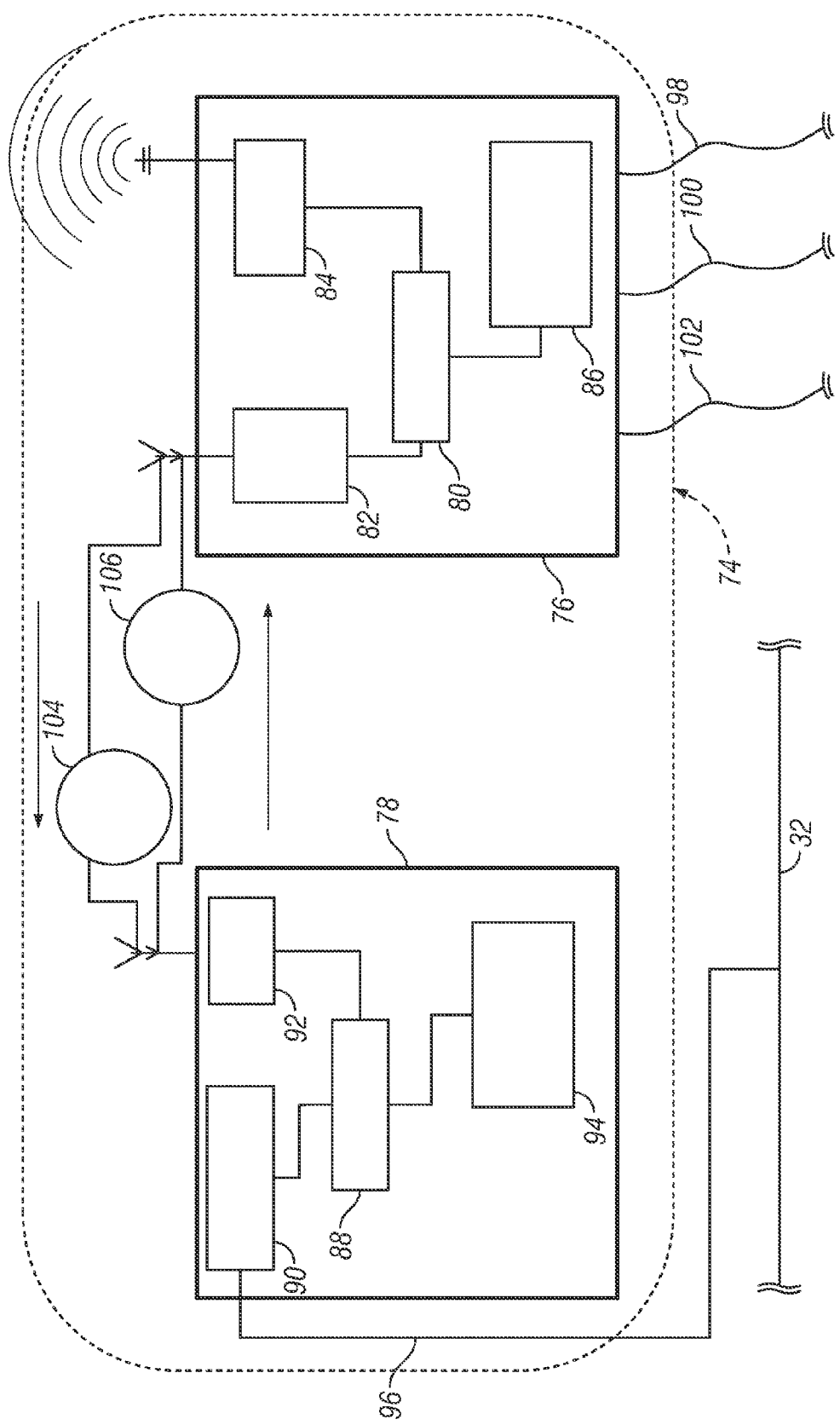
FIG. 2 is a schematic view illustrating a non-limiting example of a system for detecting an error in the installation of an electrical component.

FIG. 2 is a schematic view illustrating a non-limiting example of a system 74 for detecting an error in the installation of aftermarket telematics unit 76 into a vehicle (not shown). With continuing reference to FIG. 1, system 74 may be installed in vehicle 12. It should be understood that system 74 is not limited to use with automobiles. Any type of vehicle may benefit from the presence of an aftermarket telematics unit and, accordingly, system 74 may be implemented on any such vehicle.

System 74 includes aftermarket telematics unit 76 and vehicle communications interface 78. Aftermarket telematics units such as aftermarket telematics unit 76 and vehicle communication interfaces such as vehicle communication interface 78 are both well-known in the art. Conventional aftermarket telematics units are disclosed in pending U.S. patent application Ser. No. 12/787,472 filed on May 26, 2010, and also in U.S. Publication No. 2005/0273211 published on Dec. 8, 2005, both of which are hereby incorporated herein by reference in their entirety. Examples of a vehicle communication interface include the ecoRoute™ HD, offered by Garmin under the part number 010-11380-00, the OBDLink Bluetooth Scan Tool offered by ScanTool.net LLC under the part number 4251BT, and the Wireless Bluetooth OBDII ELM 327 Code Reader Tool available from many retailers.

Aftermarket telematics unit 76 may be substituted for telematics unit 24 in telematics system 10. In the illustrated example, aftermarket telematics unit 76 includes a processor 80, a transceiver 82, a cellular chipset 84 and an electronic data storage and 86. The vehicle communication interface 78 includes a processor 88, a vehicle bus interface 90, a transceiver 92, and an electronic data storage unit 94. In other examples, aftermarket telematics unit 76 and vehicle communication interface 78 may each include additional or fewer components.

Processor 80 may be any type of computer, computer system, microprocessor, collection of logic devices such as field-programmable gate arrays (FPGA), or any other analog or digital circuitry that is configured to calculate, and/or to perform algorithms, and/or to execute software applications, and/or to execute sub-routines, and/or to be loaded with and to execute any type of computer program. Processor 80 may comprise a single processor or a plurality of processors acting in concert.

Transceiver 82 may be any type of wireless transceiver including a transceiver that is configured to communicate via radio frequency transmissions, infra red transmissions, or via any other wireless transmission effective to communicate a signal. In other examples of aftermarket telematics unit 76, a wireless transmitter and a wireless receiver may be used in lieu of a single device such as transceiver 82.

Cellular chipset 84 is substantially identical to cellular chipset 34. Cellular chipset 84 enables aftermarket telematics unit 76 to communicate over wireless carrier system 14.

Electronic data storage unit 86 is an electronic memory device that is configured to store data. Electronic data storage and 86 may be any type of data storage component including, without limitation, non-volatile memory, disk drives, tape drives, and mass storage devices and may include any suitable software, algorithms and/or sub-routines that provide the data storage component with the capability to store, organize, and permit the retrieval of data.

Processor 88, transceiver 92, and electronic data storage unit 94 are substantially identical to processor 80, transceiver 82 and electronic data storage unit 86 and, for the sake of brevity, will not be described here in detail. Vehicle bus interface 90 includes any circuitry and hardware needed to permit vehicle communication interface 78 to physically connect to, and communicatively couple with, vehicle bus 32 as well as any circuitry and/or hardware needed to communicate with other components that are connected to vehicle bus 32. In the illustrated example, vehicle bus interface 90 is connected via lead 96 to vehicle bus 32. Vehicle communication interface 78 is further configured to draw power from vehicle bus 32 via lead 96.

Aftermarket telematics unit 76 further includes a ground line 98, a switched power line 100, and a constant power line 102. These electrical lines are configured to connect to a corresponding ground line, switched power line, and constant power line of vehicle 12. When correctly connected to the corresponding power lines of vehicle 12, aftermarket telematics unit 76 will draw power from constant power line 102 and will power on or enter a standby-mode when the switched power line of vehicle 12 indicates that vehicle 12 is powered on or off, respectively.

Processor 80 is operatively coupled with transceiver 82, cellular chipset 84 and electronic data storage and 86. Such operative coupling may be accomplished via any suitable means including both wired and wireless means. The operative coupling between processor 80 and the other components of aftermarket telematics unit 76 allows processor 80 to provide instructions and to receive data/information from each of the other components.

Similarly, processor 88 is operatively coupled with the vehicle bus interface 90, transceiver 92, and electronic data storage unit 94. Again, such operative coupling may be accomplished via any suitable means including by wired or wireless means. The operative coupling between processor 88 and the other components of vehicle communication interface 78 allows processor 88 to provide instructions and to receive data/information from each of the other components.

Processor 80 and processor 88 are each configured to control transceiver 82 and transceiver 92, respectively, in a manner that permits aftermarket telematics unit 76 and vehicle communications interface 78 to communicatively pair with one another. As used herein, the term "communicatively pair" refers to a communicative state between two components wherein each component will respond only to wireless communications at a particular frequency or employing a particular communications protocol when those communications are sent from the other component of the pair and any communications received from a non-paired component will be ignored. Despite being paired, each component may, nevertheless, be able to wirelessly communicate with other components at different frequencies or utilizing different communication protocols.

Aftermarket telematics unit 76 and vehicle communication interface 78 are configured to automatically pair with one another when they are powered on. When aftermarket telematics unit 76 is in standby mode, it may periodically activate some of its systems for relatively brief periods of time. In some examples of system 74, during such brief periods of activation, aftermarket telematics unit 76 and vehicle communication interface 78 may pair with one another. When aftermarket telematics unit 76 and vehicle communication interface 78 are communicatively paired, aftermarket telematics unit 76 may communicate with vehicle bus 32 through the vehicle communication interface 78. Accordingly, it is through such pairing that many of the traditional telematics services may be provided by aftermarket telematics unit 76.

When aftermarket telematics unit 76 and vehicle communication interface 78 are powered on and paired, each is configured to periodically communicate its own, power state to the other. For example, aftermarket telematics unit 76 is configured to periodically transmit a message 104 to vehicle communication interface 78. Message 104 contains information indicative of the power state of aftermarket telematics unit 76. Processor 88 is configured to receive message 104 through transceiver 92. Similarly, vehicle communication interface 78 is configured to periodically transmit a message 106 to aftermarket telematics unit 76. Message 106 contains information indicative of the power state of vehicle 12. Processor 80 is configured to receive message 106 through transceiver 82. In some examples, messages 104 and 106 may contain information indicative of a change of power state (e.g., one component may notify the other when switching from a powered on power state to a standby power state)

Vehicle communication interface 78 may be configured to determine the power state of vehicle 12 by monitoring message traffic transmitted across vehicle bus 32. For example, when the vehicle communication interface 78 detects the transmission of general message traffic between various components connected to vehicle bus 32, processor 88 may be configured to determine the vehicle 12 is powered on. Conversely, when vehicle communication interface 78 detects the absence of any message traffic on vehicle bus 32, vehicle communications interface 78 may be configured to determine the vehicle 12 is powered off Additionally, vehicle communications interface 78 may be configured to listen for specific messages transmitted across vehicle bus 32. For example, when the driver presses a door unlock button on a key fob or when the driver turns the ignition, a wake-up command may be transmitted by the body control module across vehicle bus 32. The wake-up command may instruct all components connected to vehicle bus 32 to power on. When vehicle communication interface 78 detects the wake-up command, vehicle communication interface 78 may be configured to determine that vehicle 12 is powered on.

Vehicle communication interface 78 may be configured to detect the power state of aftermarket telematics unit 76 in any one of several ways. In one example, vehicle communications interface 78 may detect the power state of aftermarket telematics unit 76 based on the information included in message 104. In another example, vehicle communication interface 78 may detect the power state of aftermarket telematics unit 76 based on either a change in the frequency of transmission of message 104 (such as when aftermarket telematics unit 76 switches from a powered on state to a standby state) or the complete cessation of transmissions of message 104 (such as when aftermarket telematics unit is powered off). In this example, vehicle communications interface 78 may be configured to determine that aftermarket telematics unit 76 has been powered on when the rate of transmission of message 104 increases, to determine that aftermarket telematics unit 76 has entered a standby mode when the rate of transmission of message 104 decreases, and to determine that aftermarket telematics unit 76 has been powered off when the periodic transmission of message 104 ceases entirely. In another example, vehicle communication interface 78 may be configured to detect the power state of aftermarket telematics unit 76 based on the existence of a pairing between vehicle communications interface 78 and aftermarket telematics unit 76. In this example, when vehicle communication interface 78 detects either the presence of a pairing or the initiation of a pairing, then vehicle communications interface 78 may be configured to conclude that aftermarket telematics unit 76 is powered on. Conversely, when vehicle communication interface 78 detects either the absence of a pairing or the cessation of the pairing, then vehicle communication interface 78 may be configured to conclude that aftermarket telematics unit 76 is powered off. Additionally, when vehicle communications interface 78 detects intermittent pairing, then vehicle communications interface may determine that aftermarket telematics unit 76 is in standby mode.

Processor 88 is further configured to compare the power state of vehicle 12 with the power state of aftermarket telematics unit 76. If processor 88 detects that the power state of vehicle 12 and the power state of aftermarket telematics unit 76 do not correspond, then the vehicle communication interface 78 may be configured to determine that aftermarket telematics unit 76 has been incorrectly wired to vehicle 12. When the power state of vehicle 12 is on and the power state of aftermarket telematics unit 76 is on, then the two power states correspond. Also, when the power state of vehicle 12 is off and the power state of aftermarket telematics unit 76 is standby, then the two power states correspond. When the power state of vehicle 12 has been off for greater than a predetermined period of time (typically 120 hours) and the power state of aftermarket telematics unit 76 is off, then the to power states correspond. The power state of vehicle 12 and the power state of aftermarket telematics unit 76 do not correspond when there is any deviation from these 3 scenarios.

Each particular type of non-correspondence will correlate with a particular type of wiring error. This enables processor 88 to determine the type of wiring error that was made when connecting aftermarket telematics unit 76 to vehicle 12. For example, if processor 88 detects that vehicle 12 is on and aftermarket telematics unit 76 is off, then processor 88 may be configured to determine that ground line 98 has been incorrectly connected to vehicle 12. If processor 88 detects that vehicle 12 is powered on and aftermarket telematics unit 76 is in a standby power state, then processor 88 may be configured to determine that switched power line 100 has been inadvertently connected to an incorrect switched power line of vehicle 12. If processor 88 detects that vehicle 12 is powered off an aftermarket telematics unit 76 is powered on, processor 88 may be configured to determine that switched power line 100 has been inadvertently connected to a constant power line of vehicle 12. Finally, if processor 88 detects that vehicle 12 is powered off and aftermarket telematics unit 76 is powered off (instead of being in standby mode), then constant power line 102 has been inadvertently connected to a switched power line of vehicle 12.

Once processor 88 has determined that the power state of vehicle 12 and the power state of aftermarket telematics unit 76 do not correspond, and once processor 88 has determined the type of wiring error that has been made, processor 88 is configured to notify a third-party and report both the existence of, and the cause of the wiring error. In one example, the third party may be call center 18. In an example, processor 88 may be configured to transmit an instruction to aftermarket telematics unit 76 to use cellular chipset 84 to transmit an error message to call center 18. Processor 88 may be configured to transmit such an instruction via the communicative pairing between vehicle communication interface 78 and aftermarket telematics unit 76.

In some examples, vehicle communication interface 78 may only be configured to detect the non-correspondence of the power states of vehicle 12 and aftermarket telematics unit 76 and may not be configured to determine the type of wiring error that was made when installing aftermarket telematics unit 76. In such examples, vehicle communication interface 78 will alert call center 18 about the existence of a wiring error arising out of the electrical connection of aftermarket telematics unit 76 to vehicle 12, but will not provide any information to call center 18 about the cause of such wiring error.

Depending upon the power state of aftermarket telematics unit 76, vehicle communication interface 78 may have to wait until aftermarket telematics unit 76 is powered on before communicating with call center 18. For example, if vehicle communications interface 78 detects a non-correspondence where vehicle 12 is powered off and aftermarket telematics unit 76 is powered off (instead of in standby mode), then vehicle communications interface 78 will notify the third party when aftermarket telematics unit 76 powers back on.

In some examples, processor 88 may be configured to wait until a predetermined number of non-correspondence events have been detected before alerting call center 18 about the wiring error. Such a delay in notification may help to ensure that the wiring error is genuine and that the non-correspondence has not been caused by a visit to a service center (where a non-correspondence event may be caused by the activities of a technician). In such examples, processor 88 may be configured to store information in electronic data storage and 94 pertaining to each non-correspondence event detected by processor 88. When the number of non-correspondence events reaches a predetermined number, processor 88 will alert call center 18. In other examples, processor 88 may be configured to delay notifying call center 18 about a detected non-correspondence until the non-correspondence has persisted for a predetermined period of time (e.g. fifteen minutes).

In some examples, processor 80 may be configured to determine that a wiring error has occurred. In such examples, processor 80 may be configured to utilize the information contained in message 106 to determine the power state of vehicle 12, to compare that power state with the power state of aftermarket telematics unit 76, and to determine that a wiring error has occurred when the respective power states do not correspond. As with vehicle communications interface 78, processor 80 may be further configured to determine the type of wiring error that has been made based on the type of non-correspondence that has been detected.

Figure 3:
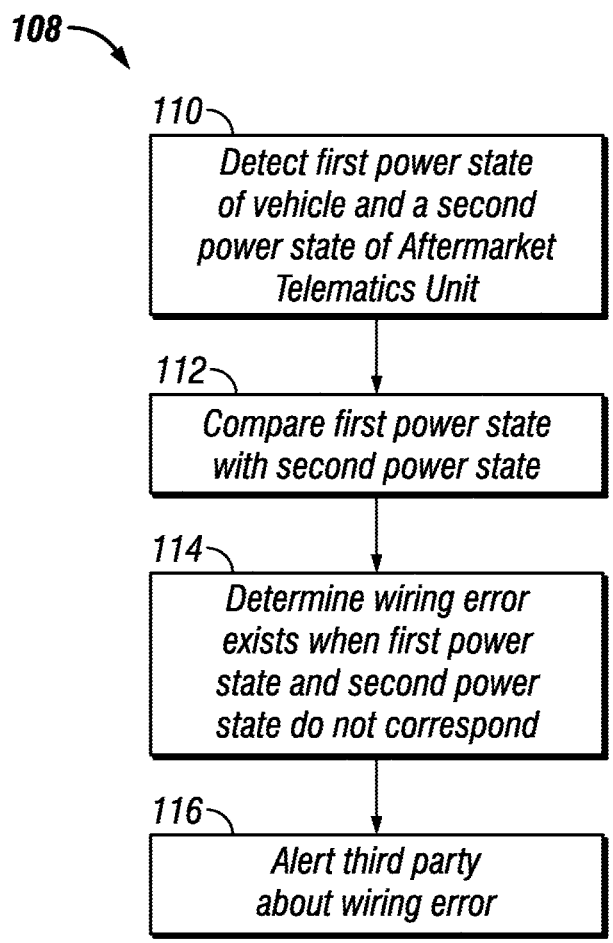
FIG. 3 is a block diagram illustrating an example of a method for detecting an error in the installation of an electrical component.

FIG. 3 is a block diagram illustrating an example of a method 108 for detecting an error in the installation of an electrical component such as an aftermarket telematics unit. With continuing reference to FIGS. 1-2, method 108 compares a power state of an aftermarket telematics unit with a power state of the vehicle to which the aftermarket telematics unit is attached. When the two power states do not correspond, then a processor employing method 108 can conclude that the aftermarket telematics unit has been improperly wired to the vehicle.

At block 110, method 108 requires that a power state of the vehicle and a power state of aftermarket telematics unit be detected. Detection of these power states may be accomplished with the use of a vehicle communication interface such as a vehicle communication interface 78 or with the use of any other component or with multiple components that are configured to detect the respective power states of the vehicle and the aftermarket telematics unit.

At block 112, the power state of the vehicle is compared with the power state of the aftermarket telematics unit. This may be accomplished through the use of a vehicle communication interface or with any other processor that is configured to compare relative power states.

At block 114, if the power state of the vehicle does not correspond with the power state of the aftermarket telematics unit then it is determined that the aftermarket telematics unit has been incorrectly electrically wired to the vehicle. Once this determination has been made, the component or components carrying out method 108 may take any of several courses of action. In one example, the duration of non-correspondence may be measured. In another example, the number of instances of non-correspondence may be recorded electronically in a data file.

In another example, such as the example illustrated at block 116, a third-party is notified about the incorrect wiring of the after market telematics unit to the vehicle. In one example, the third-party may be a call center that comprises part of a telematics system. In another example, the third-party may be the vehicle owner. In other examples, multiple third parties may be notified.

While at least one example has been presented in the foregoing detailed description, it should be appreciated that a vast number of variations exist. It should also be appreciated that the example or examples disclosed herein are only exemplary in nature, and are not intended to limit the scope, applicability, or configuration in any way. Rather, the foregoing detailed description will provide those skilled in the art with a convenient road map for implementing the example or examples. It should be understood that various changes can be made in the function and arrangement of elements without departing from the scope as set forth in the appended claims and the legal equivalents thereof

What is claimed is:

1. A system for detecting an error in the installation of an electrical component in a vehicle having a vehicle bus, the system comprising:
    a vehicle communication interface configured to be communicatively coupled with the vehicle bus and to detect a first power state of the vehicle; and
    an aftermarket telematics unit configured to be electrically connected to the vehicle and to wirelessly communicate with the vehicle communication interface,
    wherein the vehicle communication interface is further configured to detect a second power state of the aftermarket telematics unit, to compare the first power state with the second power state, to alert a third party when the first power state and the second power state do not correspond with one another, and to communicate a cause for a non-correspondence of the first power state with the second power state to the third party, the cause comprising one of:
        a. a ground line of the aftermarket telematics unit being incorrectly connected to the vehicle,
        b. a switched power line of the aftermarket telematics unit being connected to an incorrect switched power line of the vehicle,
        c. a switched power line of the aftermarket telematics unit being connected to a constant power line of the vehicle, and
        d. a constant power line of the aftermarket telematics unit being connected to a switched power line of the vehicle,
    when the non-correspondence respectively comprises one of:
        a. the first power state of the vehicle is on and the second power state of the aftermarket telematics unit is off,
        b. the first power state of the vehicle is on and the second power state of the aftermarket telematics unit is standby,
        c. the first power state of the vehicle is off and the second power state of the aftermarket telematics unit is on, and
        d. the first power state of the vehicle is off and the aftermarket telematics unit is off.

2. The system of claim 1, wherein the vehicle communication interface is configured to detect the first power state of the vehicle based on an occurrence of general message traffic being transmitted across the vehicle bus.

3. The system of claim 1, wherein the vehicle communication interface is configured to detect the first power state of the vehicle based on a specific message transmitted across the vehicle bus.

4. The system of claim 1, wherein the aftermarket telematics unit is configured to transmit a first message to the vehicle communication interface indicative of the second power state and wherein the vehicle communication interface is configured to detect the second power state of the aftermarket telematics unit based on the first message.

5. The system of claim 1, wherein the aftermarket telematics unit is configured to transmit a first message to the vehicle communication interface indicative of the second power state and wherein the vehicle communication interface is configured to detect the second power state of the aftermarket telematics unit based on a cessation of the first message.

6. The system of claim 1, wherein the aftermarket telematics unit and the vehicle communication interface are configured to be communicatively paired with one another, wherein the vehicle communication interface is configured to detect a pairing status of the vehicle communication interface and the aftermarket telematics unit, and wherein the vehicle communication interface is further configured to detect the second power state of the aftermarket telematics unit based on the pairing status.

7. The system of claim 1, wherein the aftermarket telematics unit and the vehicle communication interface are configured to be communicatively paired with one another, wherein the vehicle communication interface is configured to detect a pairing status of the vehicle communication interface and the aftermarket telematics unit, and wherein the vehicle communication interface is further configured to detect the second power state of the aftermarket telematics unit based on a cessation of a pairing between the vehicle communication interface and the aftermarket telematics unit.

8. The system of claim 1, wherein the third party is a call center.

9. The system of claim 1, wherein the vehicle communication interface is further configured to alert the third party using a communication device of the aftermarket telematics unit.

10. The system of claim 1, wherein the vehicle communication interface is configured to delay alerting the third party until after an occurrence of a predetermined number of events where the first power state does not correspond with the second power state.

11. The system of claim 1, wherein the vehicle communication interface is configured to delay alerting the third party until a duration of an event where the first power state does not correspond with the second power state exceeds a predetermined period of time.

12. The system of claim 1, wherein the vehicle communication interface is configured to communicate the first power state to the aftermarket telematics unit, wherein the aftermarket telematics unit is configured to determine whether the first power state corresponds with the second power state, and wherein the aftermarket telematics unit is further configured to alert the third party when the first power state does not correspond with the second power state.

13. A system for detecting an error in the installation of an electrical component in a vehicle having a vehicle bus, the system comprising:
  a vehicle communication interface configured to be communicatively coupled with the vehicle bus and to detect a first power state of the vehicle; and
  an aftermarket telematics unit configured to be electrically connected to the vehicle and to wirelessly communicate with the vehicle communication interface,
  wherein the vehicle communication interface is further configured to detect a second power state of the aftermarket telematics unit, to compare the first power state with the second power state, to determine a cause for non-correspondence between the first power state and the second power state when the first power state and the second power state do not correspond with another, to alert a third party when the first power state and the second power state do not correspond with one another, and to communicate the cause to the third party, and
  wherein the cause comprises one of
    a. a ground line of the aftermarket telematics unit being incorrectly connected to the vehicle,
    b. a switched power line of the aftermarket telematics unit being connected to an incorrect switched power line of the vehicle,
    c. a switched power line of the aftermarket telematics unit being connected to a constant power line of the vehicle, and
    d. a constant power line of the aftermarket telematics unit being connected to a switched power line of the vehicle,
  when the non-correspondence respectively comprises one of:
    a. the first power state of the vehicle is on and the second power state of the aftermarket telematics unit is off,
    b. the first power state of the vehicle is on and the second power state of the aftermarket telematics unit is standby,
    c. the first power state of the vehicle is off and the second power state of the aftermarket telematics unit is on, and
    d. the first power state of the vehicle is off and the aftermarket telematics unit is off.

14. The system of claim 13, wherein the third party is a call center.

15. A method for detecting an error in the installation of an electrical component in a vehicle having a vehicle bus, the method comprising the steps of:
  detecting a first power state of the vehicle and a second power state of an aftermarket telematics unit with a vehicle communication interface that is communicatively coupled with the vehicle bus;
  comparing the first power state with the second power state using the vehicle communication interface;
  determining that a wiring error exists when the first power state and the second power state do not correspond;
  determining that a cause of a non-correspondence of the power state comprises one of:
    a. a ground line of the aftermarket telematics unit being incorrectly connected to the vehicle,
    b. a switched power line of the aftermarket telematics unit being connected to an incorrect switched power line of the vehicle,
    c. a switched power line of the aftermarket telematics unit being connected to a constant power line of the vehicle, and
    d. a constant power line of the aftermarket telematics unit being connected to a switched power line of the vehicle,
  when the non-correspondence respectively comprises one of:
    a. the first power state of the vehicle is on and the second power state of the aftermarket telematics unit is off,
    b. the first power state of the vehicle is on and the second power state of the aftermarket telematics unit is standby,
    c. the first power state of the vehicle is off and the second power state of the aftermarket telematics unit is on, and
    d. the first power state of the vehicle is off and the aftermarket telematics unit is off; and
  communicating to a third party the non-correspondence of the power state and the cause of the non-correspondence of the power state.

16. The method of claim 15, further comprising the step of alerting a third party about the wiring error.

* * * * *